Aug. 14, 1928.

G. PARKER 1,680,566

CALIPER

Filed Oct. 1, 1927

Witnesses:

Inventor:
Gordon Parker,

Patented Aug. 14, 1928.

1,680,566

UNITED STATES PATENT OFFICE.

GORDON PARKER, OF COLORADO SPRINGS, COLORADO, ASSIGNOR, BY MESNE ASSIGNMENTS, TO THE PEOPLE OF THE UNITED STATES.

CALIPER.

Application filed October 1, 1927. Serial No. 223,400.

(GRANTED UNDER THE PROVISIONS OF THE ACT OF MARCH 3, 1883, 22 STAT. L., 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

Figure 1:
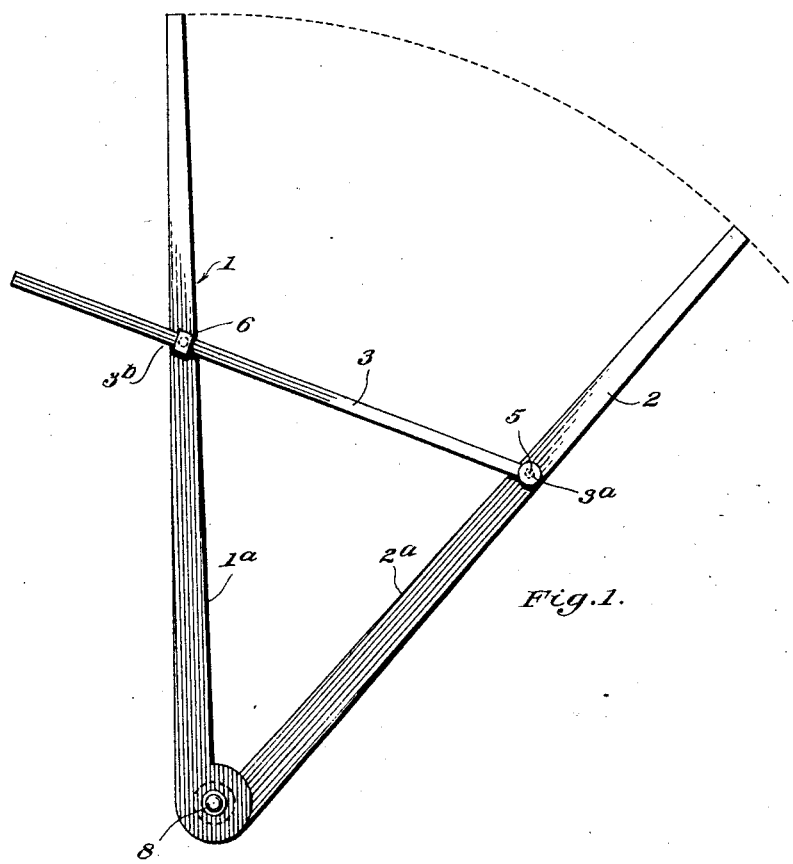
Figure 2:
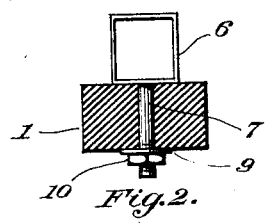
Figure 3:
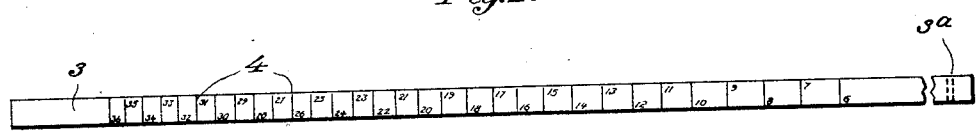

In the accompanying drawing Fig. 1 is a plan view of the caliper; Fig. 2 is a detail of the sleeve member as positioned on a section of one of the arms of the caliper; and Fig. 3 is a plan view of the cross bar with calibrations thereon.

Referring to the drawings, it will be seen that the caliper consists of arms 1 and 2, pivoted at one end by bolt 8 so located that it is in line with the inside edges $1^a$ and $2^a$ of said arms. A cross member 3 with calibrations 4 is pivoted at one end $3^a$ to arm 2 by bolt 5 and the other end $3^b$ of said cross member passes through and is adapted to slide in sleeve 6, preferably fashioned in the form of a hollow square, held in position on arm 1 by means of a bolt-like extension 7 through said arm and nut 9 and washer 10. The bolt 5 and sleeve 6 are positioned on arms 1 and 2 an equal distance from pivot 8. The inside edges $1^a$ and $2^a$ of said arms between pivot 8 and the cross member 3, together with the outside edge $3^c$ of said cross member form an isosceles triangle, the base of the triangle being the outer edge of the cross member. The altitude of the triangle varies as the compass-like arms 1 and 2 are opened.

In operation the caliper is opened and placed against the tree or log at right angles so that one arm of the calipers and the cross member both touch the tree. The other arm of the caliper is then moved up until it touches the tree snugly. The tree is thus enclosed between both arms of the caliper and the cross-member and touches all three. The cross-member bears a series of graduations or calibrations which begin at the pivoted end of the cross-member and extend out towards its free end. The calibrations are so arranged as to give the diameter of the tree or log being measured by reading the graduation at the point where the inside edge of arm #1 intersects the cross-member. The graduations for convenience in reading are placed on the side of the cross-member which faces the operator.

The cross-member is customarily graduated to give diameters in inches but can as easily be calibrated to give readings in other units of measurement if desired. The size of the complete instrument will vary according to the average size of the trees and logs to be measured. For timber up to 36″ in diameter calipers with arms 32″ long and a cross-member 22″ in length located 18″ from the central pivot is satisfactory. When not in use the free end of the cross-member can be slipped out of its sleeve by opening the arms wide enough. The cross-member may then be folded down against the closed arms making an extremely compact instrument.

The entire caliper can be constructed of metal if desired. In order to secure lightness the arms and cross-member will ordinarily be fashioned of wood with sleeve and pivot fastenings of metal. It is claimed for this device that it is simple, very easily and quickly operated and gives accurate results. It is inexpensive to construct, does not get out of order and is very easily transported.

I claim:

The herein described caliper comprising two arms pivoted at one of their ends, a cross member with calibrations thereon pivoted to one arm intermediate its length, means pivotally and slidably connecting said member to the other arm intermediate its length, the pivot points for said cross member being equi-distant from the pivot point for the arms so as to form in different adjustments an isosceles triangle, whereby when the caliper is placed at right angles to the object to be measured and the said arms and said cross member are in contact with said object the diameter of said object will be indicated by said connecting means on the calibrations on said cross member.

GORDON PARKER.